United States Patent
Glaeser

(10) Patent No.: US 8,706,927 B2
(45) Date of Patent: Apr. 22, 2014

(54) METHOD FOR THE RECOVERY OF A CLOCK AND SYSTEM FOR THE TRANSMISSION OF DATA BETWEEN DATA MEMORIES BY REMOTE DIRECT MEMORY ACCESS AND NETWORK STATION SET UP TO OPERATE IN THE METHOD AS A TRANSMITTING OR, RESPECTIVELY, RECEIVING STATION

(75) Inventor: Frank Glaeser, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 148 days.

(21) Appl. No.: 13/379,392

(22) PCT Filed: Jun. 18, 2010

(86) PCT No.: PCT/EP2010/058608
§ 371 (c)(1),
(2), (4) Date: Dec. 20, 2011

(87) PCT Pub. No.: WO2010/149576
PCT Pub. Date: Dec. 29, 2010

(65) Prior Publication Data
US 2012/0102243 A1    Apr. 26, 2012

(30) Foreign Application Priority Data

Jun. 22, 2009   (DE) .......................... 10 2009 030 047

(51) Int. Cl.
*G06F 13/28* (2006.01)
*G06F 13/00* (2006.01)

(52) U.S. Cl.
USPC .................. 710/52; 710/22; 710/60; 709/212

(58) Field of Classification Search
USPC .............................. 710/52–56, 60–61, 22–25; 709/212–213
See application file for complete search history.

(56) References Cited

U.S. PATENT DOCUMENTS

| | | | |
|---|---|---|---|
| 2005/0149613 A1* | 7/2005 | Amjadi | 709/201 |
| 2006/0146814 A1 | 7/2006 | Shah | |
| 2008/0235409 A1* | 9/2008 | Ryzhykh | 710/22 |
| 2009/0271802 A1* | 10/2009 | Biran et al. | 719/313 |

FOREIGN PATENT DOCUMENTS

| | | |
|---|---|---|
| DE | 60111551 T2 | 2/2002 |
| WO | WO 02/17576 | 2/2002 |

OTHER PUBLICATIONS

DE Search Rept: Mar. 12, 2010.
Search Rept: Sep. 14, 2010.

* cited by examiner

*Primary Examiner* — Christopher Shin
(74) *Attorney, Agent, or Firm* — International IP Law Group, PLLC

(57) ABSTRACT

In the method, data are transmitted between a first memory allocated to a source computer and a second memory allocated to a target computer via a network by remote direct memory access. On the source computer side, a predetermined number of directly consecutive transmission buffers is selected from a continuous buffer memory area and transmitted in a single RDMA transmission process to the target computer. On the target computer side, an RDMA data transfer is executed over the entire continuous buffer memory area and a buffer sequence procedure. The buffer sequence procedure causes the received buffers to be supplied to the target application in the transmitted sequence.

Figure 1:
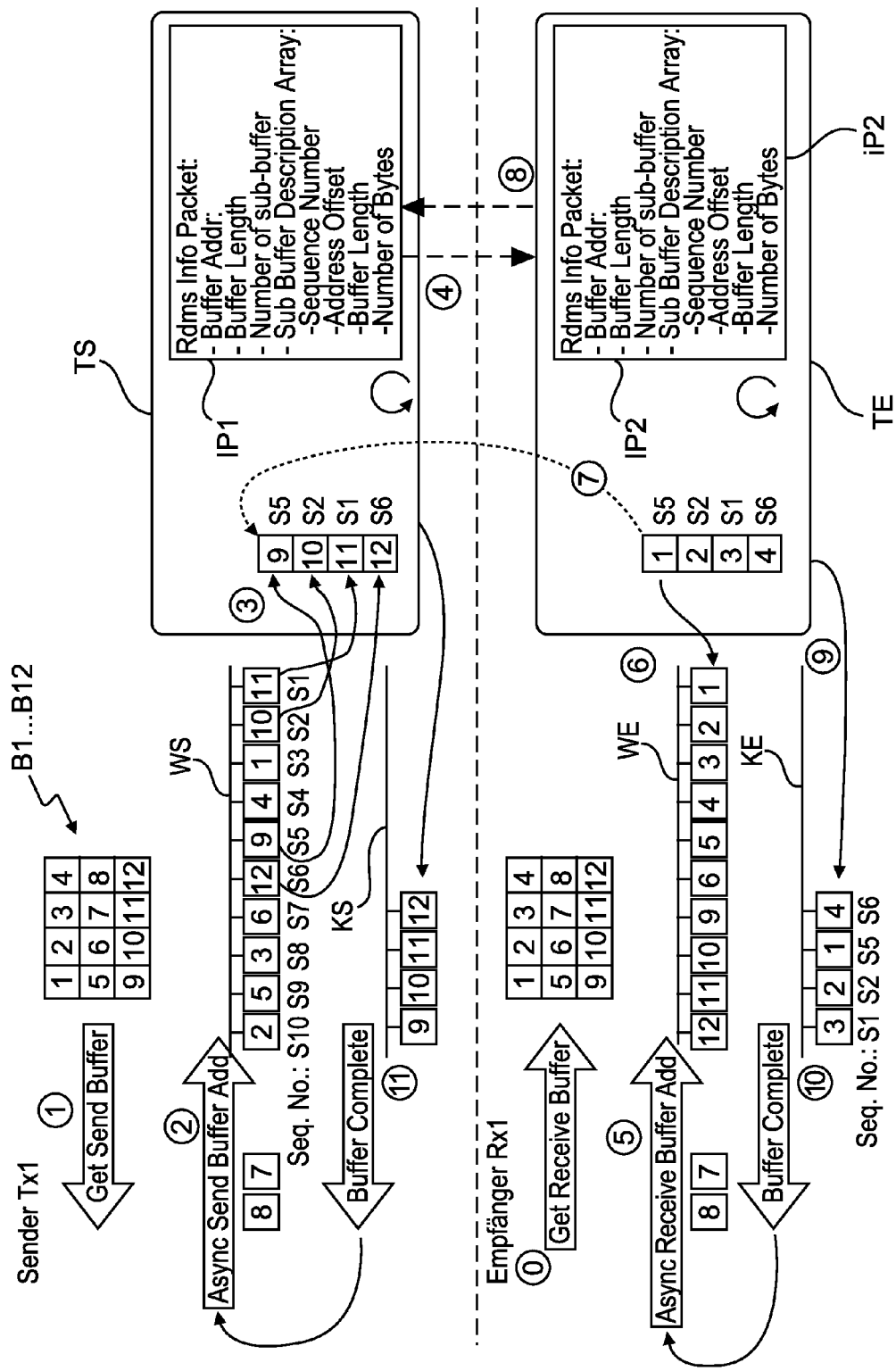

10 Claims, 2 Drawing Sheets ic # METHOD FOR THE RECOVERY OF A CLOCK AND SYSTEM FOR THE TRANSMISSION OF DATA BETWEEN DATA MEMORIES BY REMOTE DIRECT MEMORY ACCESS AND NETWORK STATION SET UP TO OPERATE IN THE METHOD AS A TRANSMITTING OR, RESPECTIVELY, RECEIVING STATION

This application claims the benefit, under 35 U.S.C. §365 of International Application PCT/EP2010/058608, filed Jun. 18, 2010, which was published in accordance with PCT Article 21(2) on Dec. 29, 2010 in English and which claims the benefit of German patent application No. 102009030047.3, filed Jun. 22, 2009.

The invention relates to a method and a system for the transmission of data between data memories by remote direct memory access (RDMA).

PRIOR ART

RDMA data transport methods are prior art in which e.g. PC extension cards or other interfaces are used which can read or write remote memory areas via RDMA hardware. With an RDMA data transport method, data are copied, without an additional copy, from the memory of the source computer to the memory of the target computer. The copying function is executed by the hardware of a network card. This provides for very fast data transfer without the need to use CPU loads in source and target computers.

Two types of RDMA operations are basically distinguished: the RDMA read operation and the RDMA write operation.

With an RDMA read operation, a transmission application transmits a small info packet, including values for the memory address and the length of the transmission data buffer, to a receiving application. After receipt of the address information contained in the said info packet, the receiving application performs an RDMA read operation to the remote memory address and transmits data to the own application receiving data buffer memory.

Different RDMA data transmission methods exist in which comparatively small transport data buffers are used as, for example, in RDMA-based memory protocol implementations such as SRP (SCSI RDMA Protocol) or iSER (iSCSI Extensions for RDMA) in connection with RDMA streaming applications.

It is to be considered unfavorable in this respect that with RDMA data transmissions using such small transport data buffers, the transmission of transmitting or receiving addresses based on additional info packets presents a significant overhead which, in the end, reduces the available transport data rate.

INVENTION

The objective of the present invention is to reduce the RDMA transport specific overhead in comparison with the prior art, with the same size of the transport data buffer being used by the user application.

This problem is solved by a method with the features of claim 1. Advantageous embodiments of the invention are defined in additional claims.

In the method, data are transmitted between a first memory allocated to a source computer and a second memory allocated to a target computer via a network by remote direct memory access (RDMA). On the source computer side, a predetermined number of transmission buffers is selected from a continuous buffer memory and transmitted in a single RDMA transmission process to the target computer. On the target computer side, an RDMA data transfer is executed over the entire selected buffer memory area and a buffer sequence procedure. The buffer sequence procedure causes the received buffers to be supplied to the target application in the transmitted sequence.

According to an embodiment of the method according to the invention, all transport buffers used with the method are allocated from a registered continuous buffer memory area.

The buffer memory used with the method according to the invention consists, in particular, of an area of continuous physical memory addresses of the source or, respectively, the target computer.

The buffer memory area is subdivided into individual data blocks. Each allocatable transport buffer is allocated to an administrative data structure which comprises a memory number for the identification of the position of the corresponding transport buffer in the buffer memory area and a sequence number for the identification of the transport buffer in the transport data stream.

In a variant of the embodiment of the method according to the invention, the method comprises the following steps:

Provision of the transport buffers from the registered continuous buffer memory area on the part of the transmission application and the receiving application;
a filling step in which transmission buffers are inserted into an asynchronous transmission buffer queue;
searching a predetermined number of directly consecutive transport buffers in the continuous buffer memory area in the asynchronous transmission buffer queue, based on the respective memory number in each administrative data structure through a transmission processing thread;
transmission of the memory address of the first found transport buffer, together with the value for the length of the entire area of the found transport buffers and the corresponding sequence numbers from source computer to target computer in a first RDMA info packet;
an execution step in which an asynchronous receiving operation is performed;
an RDMA read step, comprising the receipt of the first RDMA info packet, the determination of the required number of continuous receiving buffers from the receiving buffer queue and the execution of an RDMA read operation to transmit the data from all participating transmission buffers to the receiving buffers;
a read complete confirmation step following upon a successful RDMA read operation in which an RDMA read complete message is transmitted to the target computer;
a sequence step following a successful RDMA transport in which the receiving buffers are assigned the appropriate sequence numbers and the receiving buffers are lined in sequence in a receiving buffer completion queue; and
a completion step in which the receiving buffers are completed for the user application.

According to an embodiment of the method according to the invention, the filling step comprises the filling of the transmission buffers by the transmission application, calling the transmission functions by the transmission application to fill the transmission buffers into the asynchronous transmission buffer queue, and the sequential allocation of sequence numbers to the transmission buffers in the sequence of the function call by the transmission function processing.

In a variant of the embodiment of the method according to the invention, the execution step comprises calling asynchronous receiving functions by the receiving application to insert all available data receiving buffers into an asynchronous receiving buffer queue, and the automatic sorting of the data receiving buffers in the receiving buffer queue according to descending or ascending buffer memory number.

According to an embodiment of the method according to the invention, the sequence step comprises the separation of the individual receiving buffers, the allocation of the corresponding sequence numbers to receiving buffer administrative structures through the receiving processing thread, the insertion of the separated receiving buffers on one end of the receiving buffer completion queue and sorting the inserted receiving buffers in the receiving buffer completion queue according to ascending or descending sequence number.

The completion step, for example, comprises the removal of the transport buffers on the other end of the receiving buffer completion queue, emptying the receiving buffer completion queue and returning the transport buffers to the receiving buffer queue.

According to an embodiment of the method according to the invention, a second RDMA info packet is transmitted to the transmitter in the read complete confirmation step to end the RDMA read operation.

The method according to the invention has the advantage that the overhead for the address transport and the number of required RDMA operations are significantly reduced in comparison with the prior art. This advantage is particularly important for methods which are carried out with small transport buffers, as is the case with RDMA streaming for instance.

DRAWINGS

Figure 2:
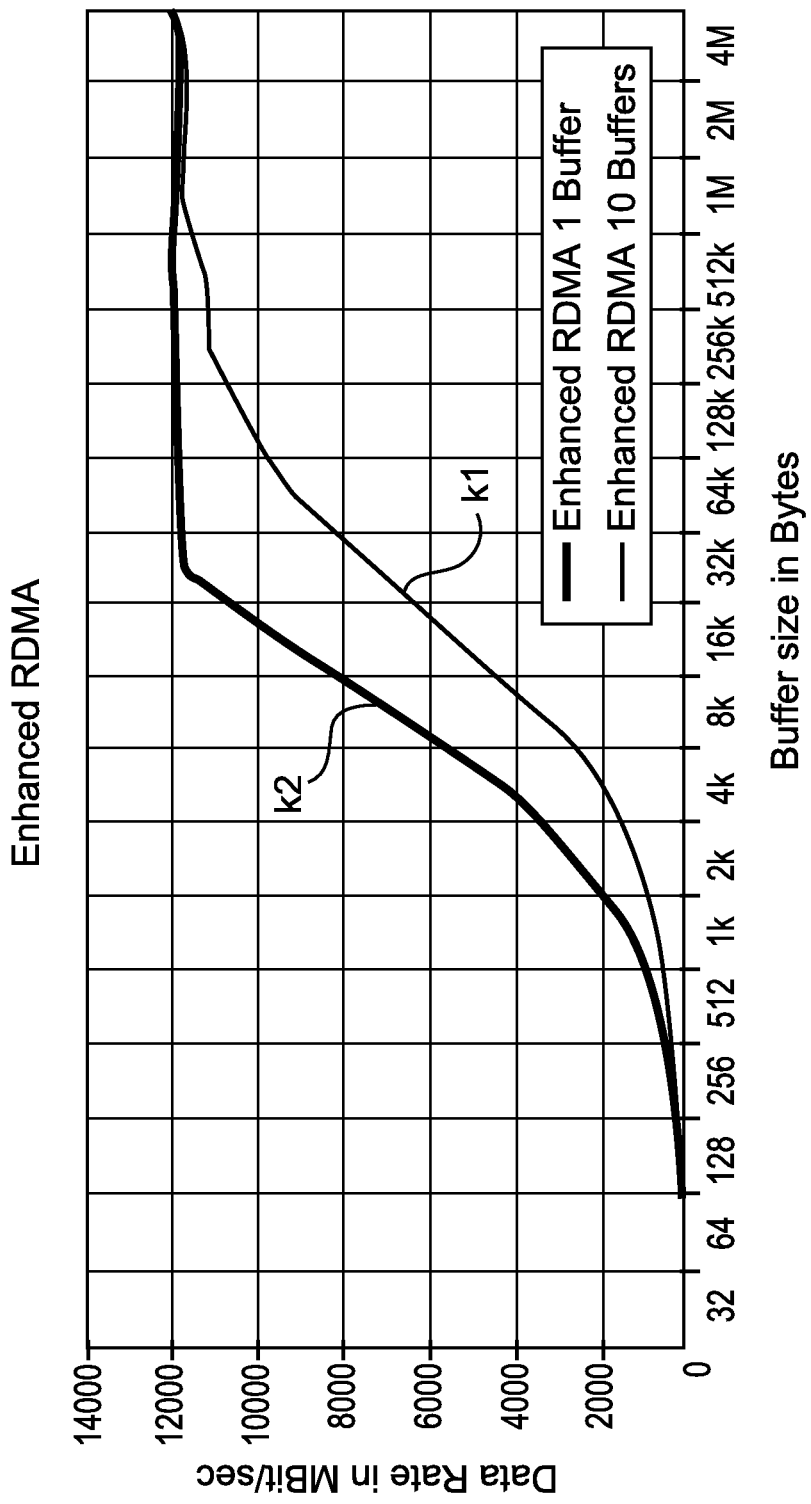

In the following, further advantages and details of the invention are described with reference to the enclosed drawings. It is shown in:

FIG. 1 a basic flow diagram to illustrate the flow of data transmission with the method according to the invention; and FIG. 2 a graph with measuring results characterizing the method according to the invention.

EXEMPLARY EMBODIMENT OF THE INVENTION

FIG. 1 shows a purely basic flow diagram to illustrate the flow of data transmission with the method according to the invention. The individual subprocedures of the method according to the invention are numbered according to the circled numerals 0 to 11 in FIG. 1.

With the method according to the invention, a transport buffer pool is made available which is controlled or checked by the RDMA transport software.

All transport data buffers used with the method according to the invention are to be allocated from this transport buffer pool by the user application. The transport buffer pool is generated from a continuous buffer memory area which is registered for the direct memory access (DMA) and subdivided into data blocks B1, B2, B3 . . . B12 (called "chunks" in English-language technical literature) whose size is equivalent to the required transmitting/receiving data buffer size. Aside from the memory address and the value of the buffer length, each allocatable transport data buffer consists of an administrative structure which comprises a memory number for the identification of the position of the corresponding transport buffer in the buffer memory area and a sequence number for the identification of the transport buffer in the transport data stream.

In the method according to the invention, transport buffer data from a registered continuous buffer memory area is first made available in two initialization subprocedures (subprocedure no. 0 and subprocedure no. 1) by the transmission application and the receiving application.

Thereafter follows subprocedure no. 2 which comprises filling the transmission buffers by the transmission application, calling transmission functions by the transmission application to fill the data transmission buffers into the asynchronous transmission buffer queue WS, as well as the sequential allocation of sequence numbers S1, S2, S3, S4, S5, S6, S7, S8, S9, S10 to the transmission buffers in the sequence of the function calls by transmission function processing.

The subprocedure no. 3 following subprocedure no. 2 comprises searching a predetermined number of transport buffers with continuous buffer memories in the asynchronous transmission buffer queue WS based on the corresponding memory number in each buffer administrative structure by the transmission processing thread TS.

In subprocedure no. 4, the memory address of the first established buffer, together with the value for the length of the entire continuous buffer memories of all established buffers and the corresponding sequence numbers S1, S2, S3, S4, S5, S6, S7, S8, S9, S10, is transmitted from the source computer to the target computer in a first RDMA info packet IP1.

The first info packet IP1 comprises information about the buffer address, the buffer length, the number of sub-buffers.

The first info packet IP1 furthermore comprises a first sub-buffer description array which in turn comprises information about the sequence number, address offset, buffer length and number of bytes.

After subprocedure no. 4, subprocedure no. 5 follows which comprises calling asynchronous receiving functions by the receiving application to insert all available receiving buffers into an asynchronous receiving buffer queue WE, and the automatic sorting of receiving buffers in the receiving buffer queue WE according to descending or ascending buffer memory number.

Subprocedure no. 6 comprises searching a specific number of transport buffers with the continuous buffer memory.

Subprocedure no. 7 comprises the reception of the first RDMA info packet IP1 and determination of the required number of continuous receiving buffers from the receiving buffer queue WE, as well as the execution of an RDMA read operation to transfer the data from all participating transmission buffers to the receiving buffers.

After successful RDMA read operation, a second RDMA info packet IP2 is transmitted to the source computer to end the RDMA read operation.

Subprocedure no. 8 comprises a read complete confirmation step in which an RDMA read complete message is transmitted in the form of a second info packet IP2 to the source computer.

The second info packet IP2 which presents the read complete message comprises information about the buffer address, the buffer length, the number of sub-buffers.

The second info packet IP2 furthermore comprises a second sub-buffer description array which in turn comprises information about the sequence number, address offset, buffer length and number of bytes.

In subprocedure no. 9 following the successful RDMA transport follows the separation of the individual receiving buffers and the allocation of the corresponding sequence numbers to receiving buffer administrative structures through the receiving processing thread TE, the insertion of the separated receiving buffers on one end of the receiving buffer completion queue KE, as well as sorting the inserted receiving buffers in the receiving buffer completion queue KE according to ascending or descending sequence number.

Subprocedure no. 10 comprises the removal of transport buffers on the other end of the asynchronous receiving buffer completion queue KE, emptying the receiving buffer completion queue KE, and returning the transport buffers to the receiving buffer queue WE.

Simultaneous with (or) subsequent to the subprocedure no. 8, there follows on the side of the transmission application in subprocedure no. 11 the insertion of all participating transmission data buffers into the asynchronous transmission buffer completion queue KS by the transmission processing thread TS, the removal of the completed transmission buffers from the transmission buffer completion queue KS and a renewed filling and insertion of the transmission buffers into the transmission buffer queue WS through the transmission application.

It is to be noted in this connection that with the receipt of IP2 by the transmission application, all transmission buffers can be released for renewed use. This may also be done simultaneously with subprocedure 10 since both procedures (10 and 11) are executed on different computers. However, the release of all transmission buffers for renewed use takes place in any event after the receipt of IP2.

To sum it up, the invention is based on the concept of transmitting a plurality of buffer addresses in an info packet to thus reduce the additional transport overhead of address transmissions. An RDMA read/write operation can now be executed only to a continuous memory area on the respectively other side. That means in other words that the transport overhead is reduced for the transmission of remote buffer addresses and the RDMA operation is to be performed for each individual remote address.

FIG. 2 shows a graph with measuring results characterizing the method according to the invention. In the graph, the data rate (in Mbit/second) is provided over the buffer size (in bytes).

While the graph compares the results with the use of one transport buffer (first curve K1) on one hand and ten transport buffers (second curve K2) the other hand, the graph obviously reflects the advantages of the method according to the invention as a function of the buffer size used.

It is to be noted that the maximum data rate reachable with the test device is 11,800 Mbit/seconds.

The invention claimed is:

1. Method for the transmission of data between a first memory allocated to a source computer and a second memory allocated to a target computer via a network by remote direct memory access wherein, on the source computer side, a predetermined number of directly consecutive transmission buffers is selected from a registered continuous buffer memory area and transmitted in a single remote direct memory access (RDMA) data transfer to the target computer and wherein, on the target computer side, a buffer sequence procedure is executed which causes the received data from the transmission buffers to be supplied to the target application in the transmitted sequence, the method comprising:

provisioning of the transmission buffers from the registered continuous buffer memory area on the part of the transmission application and the receiving application;

inserting transmission buffers into an asynchronous transmission buffer queue;

searching a predetermined number of continuous transport buffers in the asynchronous transmission buffer queue based on the respective memory number in each administrative data structure through a transmission processing thread;

transmitting of the memory address of the first transport buffer, together with the value for the length of the buffer memory area selected in the preceding step, for the predetermined number of transport buffers and the corresponding sequence numbers from source computer to target computer in a first RDMA info packet;

performing an asynchronous receiving operation;

reading the RDMA, comprising reading the receipt of the first RDMA info packet, reading the determination of the required number of continuous receiving buffers from an asynchronous receiving buffer queue and the execution of an RDMA read operation to transmit the data from all participating transmission buffers to the receiving buffers;

confirming a read complete following upon a successful RDMA read operation in which an RDMA read complete message is transmitted to the source computer;

assigning, following a successful RDMA transport, the receiving buffers the appropriate sequence numbers and the receiving buffers are lined in sequence in a receiving buffer completion queue; and completing the receiving buffers for the user application.

2. Method according to claim 1, wherein all transport buffers used with the method are allocated from a registered continuous buffer memory area which is subdivided into individual data blocks of the size of a transport buffer, wherein each allocable transport buffer is allocated an administrative structure which comprises a memory number for the identification of the position of the corresponding transport buffer in the buffer memory area and a sequence number for the identification of the transport buffer in the transport data stream.

3. Method according to claim 1, wherein the filling step comprises the filling of the transmission buffers by the transmission application, calling the transmission functions by the transmission application to fill the transmission buffers into the asynchronous transmission buffer queue and the sequential assignment of sequence numbers to the transmission buffers in the sequence of the function call by the transmission function processing.

4. Method according to claim 1, wherein the execution step comprises calling asynchronous receiving functions by the receiving application to insert all available receiving buffers into the asynchronous receiving buffer queue and the automatic sorting of the receiving buffers in the receiving buffer queue according to descending or ascending buffer memory number.

5. Method according to claim 1, wherein the sequence step comprises the separation of the individual receiving buffers, the allocation of the corresponding sequence numbers to receiving buffer administrative structures through a receiving processing thread the insertion of the separated receiving buffers on one end of the receiving buffer completion queue and sorting the inserted receiving buffers in the receiving buffer completion queue according to ascending or descending sequence number.

6. Method according to claim 1, wherein the completion step comprises the removal of the transport buffers on the other end of the receiving buffer completion queue emptying the receiving buffer completion queue and returning the transport buffers to the receiving buffer queue.

7. Method according to claim 1, wherein in the read complete confirmation step, a read complete message in particular in the form of a second RDMA info packet transmitted to the source computer to end the RDMA read operation.

8. System for the transmission of data between data memories by remote direct memory access, the system comprising:

a source computer having a first memory allocation;
a target computer having a second memory allocation;
a non-transitory computer-readable media having instructions stored thereon, that when executed by a processing device cause the processing device to transmit data, according to a method, between the first memory allocated to the source computer and the second memory allocated to the target computer via a network by remote direct memory access wherein, on the source computer side, a predetermined number of directly consecutive transmission buffers is selected from a registered continuous buffer memory area and transmitted in a single remote direct memory access (RDMA) data transfer to the target computer and wherein, on the target computer side, a buffer sequence procedure is executed which causes the received data from the transmission buffers to be supplied to the target application in the transmitted sequence, the method comprising:

provisioning of the transmission buffers from the registered continuous buffer memory area on the part of the transmission application and the receiving application;

inserting transmission buffers into an asynchronous transmission buffer queue;

searching a predetermined number of continuous transport buffers in the asynchronous transmission buffer queue based on the respective memory number in each administrative data structure through a transmission processing thread;

transmitting of the memory address of the first transport buffer, together with the value for the length of the buffer memory area selected in the preceding step, for the predetermined number of transport buffers and the corresponding sequence numbers from source computer to target computer in a first RDMA info packet;

performing an asynchronous receiving operation;

reading the RDMA, comprising reading the receipt of the first RDMA info packet, reading the determination of the required number of continuous receiving buffers from an asynchronous receiving buffer queue and the execution of an RDMA read operation to transmit the data from all participating transmission buffers to the receiving buffers;

confirming a read complete following upon a successful RDMA read operation in which an RDMA read complete message is transmitted to the source computer;

assigning, following a successful RDMA transport, the receiving buffers the appropriate sequence numbers and the receiving buffers are lined in sequence in a receiving buffer completion queue; and completing the receiving buffers for the user application.

9. The system of claim 8, comprising a network station set up to operate as a transmitting station.

10. The system of claim 8, comprising a network station set up to operate as a receiving station.

* * * * *